US012164776B2

(12) United States Patent
Duval et al.

(10) Patent No.: US 12,164,776 B2
(45) Date of Patent: Dec. 10, 2024

(54) MODES TO EXTEND LIFE OF MEMORY SYSTEMS

(71) Applicant: Micron Technology, Inc., Boise, ID (US)

(72) Inventors: Olivier Duval, Pacifica, CA (US); Luca Porzio, Casalnuovo (IT)

(73) Assignee: Micron Technology, Inc., Boise, ID (US)

( * ) Notice: Subject to any disclaimer, the term of this patent is extended or adjusted under 35 U.S.C. 154(b) by 10 days.

(21) Appl. No.: 17/664,327

(22) Filed: May 20, 2022

(65) Prior Publication Data

US 2023/0205426 A1 Jun. 29, 2023

Related U.S. Application Data

(60) Provisional application No. 63/266,153, filed on Dec. 29, 2021.

(51) Int. Cl.
*G06F 3/06* (2006.01)
(52) U.S. Cl.
CPC .......... *G06F 3/0616* (2013.01); *G06F 3/0604* (2013.01); *G06F 3/0634* (2013.01); *G06F 3/0659* (2013.01); *G06F 3/0679* (2013.01)

(58) Field of Classification Search
CPC .... G06F 3/0616; G06F 3/0604; G06F 3/0634; G06F 3/0659; G06F 3/0679
See application file for complete search history.

(56) References Cited

U.S. PATENT DOCUMENTS

| | | | |
|---|---|---|---|
| 10,523,444 B2* | 12/2019 | Strong | G06F 21/602 |
| 2013/0159797 A1* | 6/2013 | Peng | G11C 16/349 |
| | | | 714/E11.001 |
| 2016/0342344 A1* | 11/2016 | Kankani | G06F 3/061 |
| 2019/0014023 A1* | 1/2019 | Gupta | H04L 41/0659 |

\* cited by examiner

*Primary Examiner* — Baboucarr Faal
(74) *Attorney, Agent, or Firm* — Holland & Hart LLP

(57) ABSTRACT

Methods, systems, and devices for modes to extend life of memory systems are described. In some examples a host system and a memory system may support one or more vendor commands to configure one or more logical units of the memory system to be accessible in a read-only mode. For example, the host system may periodically transmit a command to retrieve health information of the memory system. The host system may compare the health information to one or more thresholds associated with one or more host entities. If the health information satisfies a threshold for a host entity, the host system may transmit a command to the memory system to initiate a read-only mode for the logical units associated with the host entity. Additionally or alternatively, the memory system may track the health information and compare the health information to the one or more thresholds.

25 Claims, 8 Drawing Sheets

MODES TO EXTEND LIFE OF MEMORY SYSTEMS

CROSS REFERENCE

The present Application for Patent claims the benefit of U.S. Provisional Patent Application No. 63/266,153 by DUVAL et al., entitled "MODES TO EXTEND LIFE OF MEMORY SYSTEMS," filed Dec. 29, 2021, assigned to the assignee hereof, and expressly incorporated by reference herein.

FIELD OF TECHNOLOGY

The following relates generally to one or more systems for memory and more specifically to modes to extend life of memory systems.

BACKGROUND

Memory devices are widely used to store information in various electronic devices such as computers, user devices, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

Figure 1:
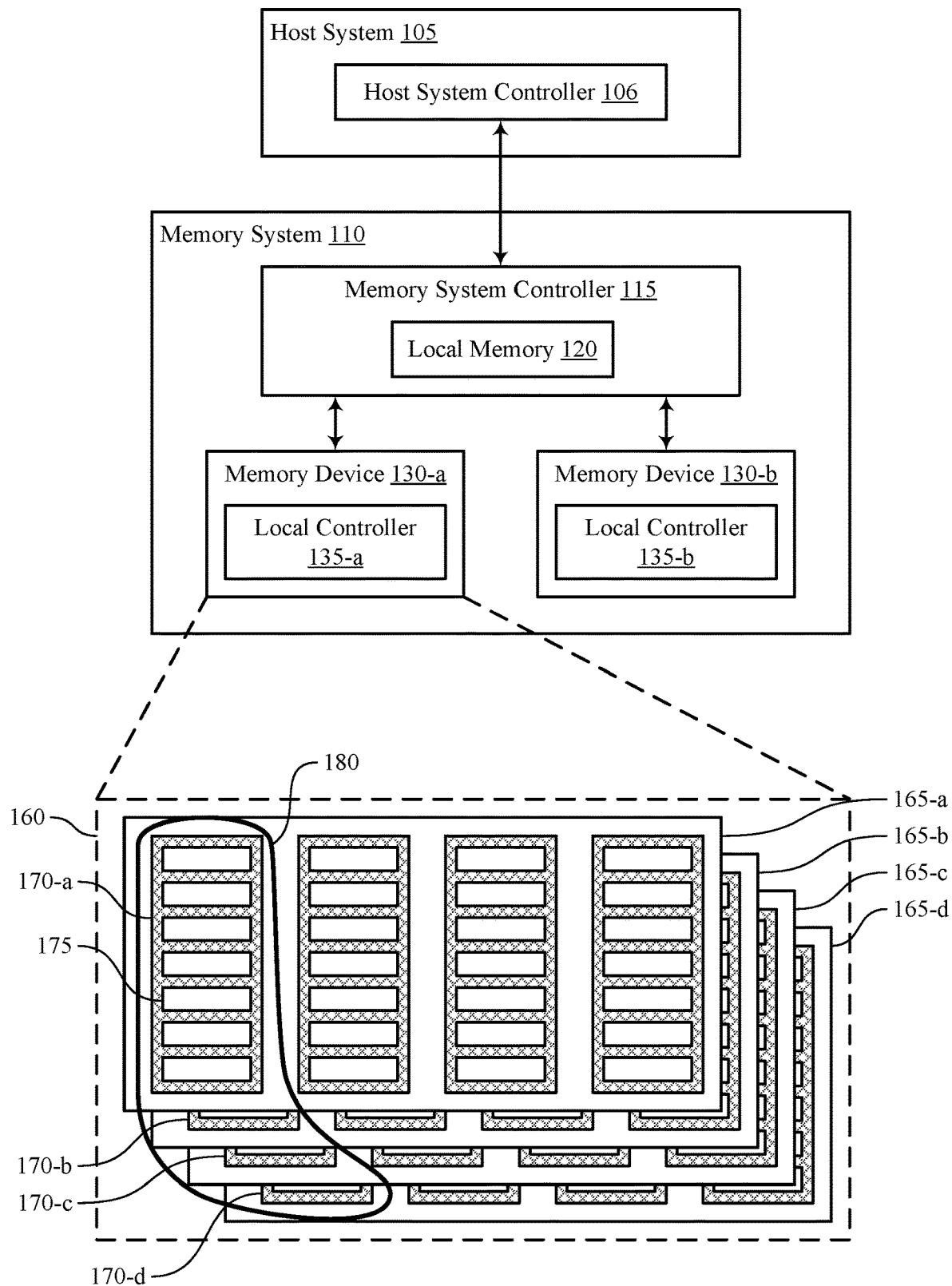
FIG. 1 illustrates an example of a system that supports modes to extend life of memory systems in accordance with examples as disclosed herein.

One or more host entities, such as virtual machines, containers, or other independent software entities, of a host system may share access to a common memory system or memory device. The memory system may include one or more logical units (e.g., logical groupings of memory cells) that may be associated with the one or more host entities. For example, an automotive system may include one or more host entities which share a command memory system. In some case, programs being executed by one host entity may perform many write or erase operations to the memory system, which may cause the memory system to prematurely reach the end of its life, and thus prevent other host entities from operating. In some cases, a host entity may have or include a priority or weight associated with the relative importance of the host entity. For example, a host entity executing safety related features of an automobile, such as a speedometer, may have a higher priority than a host entity executing software to play audio or video files. A memory system may implement an endurance group feature to apply wear leveling algorithms across logical units. However, some memory systems, such as Universal Flash Storage (UFS) devices or embedded Multi-Media Controller (eMMC) devices, may not support endurance groups. Additionally, implementing an endurance group feature in some memory systems may be overly complex, and thus may not be economically viable. Thus, techniques to efficiently extend life of memory systems are desired.

As described herein, a host system and a memory system may support one or more vendor commands or vendor unique commands to configure one or more logical units to be accessible in a read-only mode. For example, the host system may periodically transmit a command to retrieve health information of the memory system, such as an estimated remaining lifetime of the memory system or the total bytes written (TBW) to the memory system. The host system may use the retrieved health information to generate an endurance parameter for the memory system. The host system may compare the endurance parameter to one or more thresholds respectively associated with the one or more host entities. In some cases, a threshold associated with a host entity may depend on the priority of the host entity. If the endurance parameter satisfies a threshold for a host entity, the host system may transmit a command to the memory system to initiate a read-only mode for the logical units associated with the host entity. Additionally or alternatively, the memory system may track the health information, generate an endurance parameter, and compare the generated endurance parameter to the one or more thresholds. For example, the host system may transmit a command to initiate a tracking mode for one or more logical units of the memory system associated with one or more host entities of the host system. The memory system may then periodically update the health information and endurance parameter, and compare the endurance parameter to the thresholds associated with the logical units. If the endurance parameter satisfies a threshold for a logical unit, the memory system may initiate the read-only mode for the logical unit.

Features of the disclosure are initially described in the context of systems, devices, and circuits with reference to FIG. 1. Features of the disclosure are described in the context of a system and process flows with reference to FIGS. 2-4. These and other features of the disclosure are further illustrated by and described in the context of an apparatus diagram and flowchart that relate to modes to extend life of memory systems with reference to FIGS. 5-8.

FIG. 1 illustrates an example of a system 100 that supports modes to extend life of memory systems in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a UFS device, an eMMC device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may in some cases instead be performed by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EE-PROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

The system 100 may include any quantity of non-transitory computer readable media that support modes to extend life of memory systems. For example, the host system 105, the memory system controller 115, or a memory device 130 (e.g., a local controller 135) may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

In some cases, the host system 105, the memory system 110, or both may move a logical unit associated with a host entity into a read-only state or read-only mode if an endurance parameter of the memory system 110 satisfies a threshold associated with the host entity. In some cases, the endurance parameter of the memory system 110 may include or may depend on health information of the memory system 110. While in a read-only mode, a host entity 120 may be configured to not write data or information to a logical unit, while still being configured to read data or information from the logical unit. For example, the host system 105 and the memory system 110 may support one or more vendor commands to track health information of the memory system, to track health status of the logical units, to initiate a read-only mode of a logical unit, or any combination thereof. A vendor command may include a vendor-defined operational code, which the memory system 110 may decrypt and perform actions or operations according to instructions stored in the memory system 110, such as in firmware or a controller.

Figure 2:
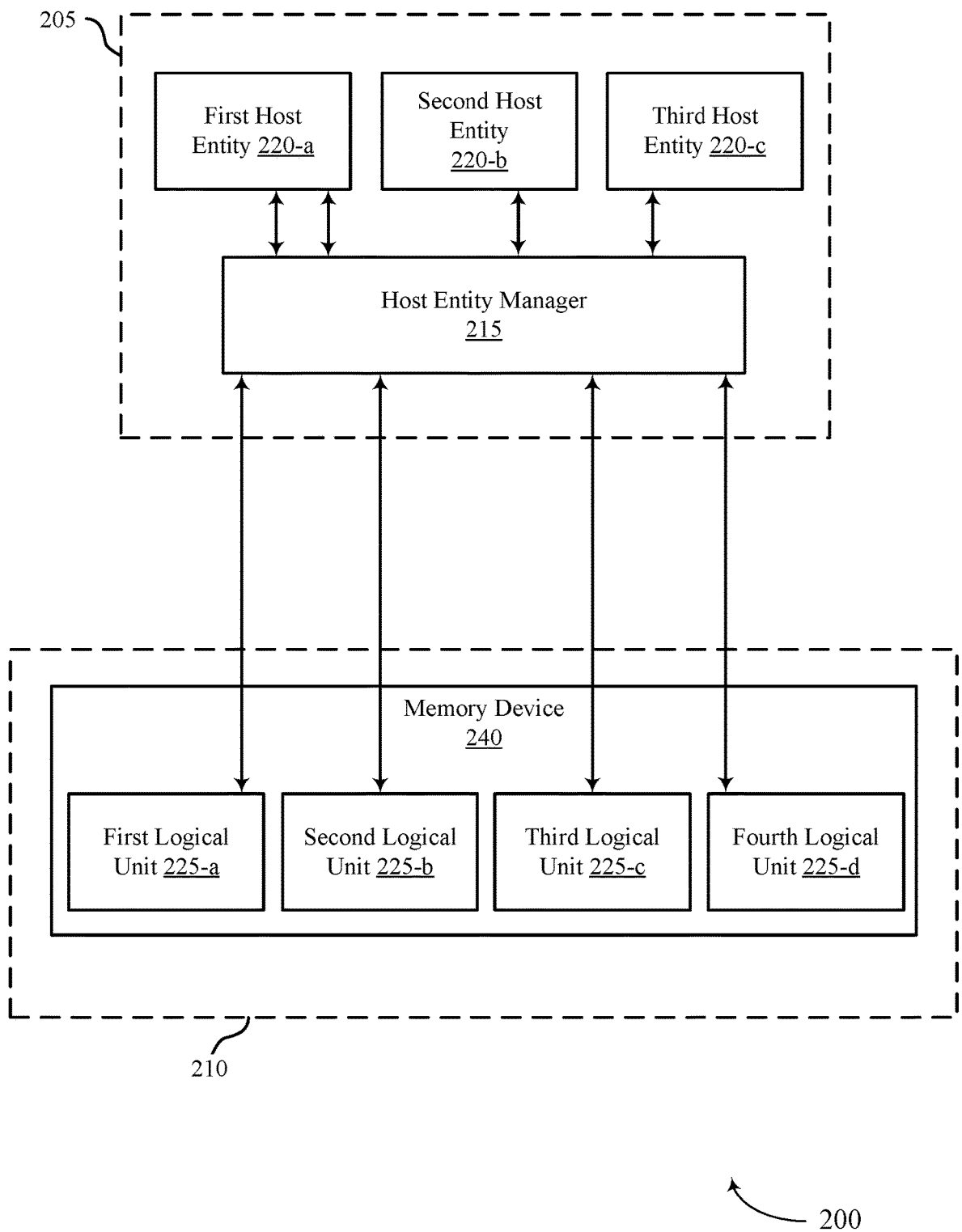
FIG. 2 illustrates an example of a system that supports modes to extend life of memory systems in accordance with examples as disclosed herein.

FIG. 2 illustrates an example of a system 200 that supports modes to extend life of memory systems in accordance with examples as disclosed herein. The system 200 may include a host system 205 and a memory system 210, which may be examples of the respective systems described with reference to FIG. 1. In some cases, such as in an automotive setting, the host system 205 may include one or more virtual machines, containers or other independent software entities, such as a first host entity 220-a, a second host entity 220-b, a third host entity 220-c, or any combination or quantity of host entities. Each host entity 220 may operate different features or perform different functions of the host system 205, and may be each be associated with a priority or weight.

In some cases, the host entities 220 may share a common memory system (e.g., the memory system 210), for example by reading data from or storing data to a memory device 240 of the memory system 210. In some cases, the memory device 240 may support a limited or finite quantity of write or erase operations. For example, as data is written to and erased from the physical memory cells of the memory device 240, the memory cells may wear out or may no longer be able to store data. In some cases, a host entity 220 with a relatively low priority may perform a large quantity of access operations (e.g., compared to a higher priority host entity 220), which may reduce the remaining lifetime of the memory system 210. Accordingly, it may be advantageous to limit or restrict the ability of a lower priority host entity 220 to perform write or erase operations, so that a higher priority host entity 220 may continue to perform write or erase operations (e.g., so that the higher priority entity may have a larger share of the endurance of the memory system 210).

By way of example, the first host entity 220-a may be an example of a real-time operating system such as QNX, and may perform functions related safety operations of the host system 205, such as dashboard speedometer displays. Additionally or alternatively, the second host entity 220-b may be an example of a mobile operating system, such as an Android system, and may be related to information or entertainment functions, such as playing music or video or other functions which may not be related to safety operations. Accordingly, the first host entity 220-*a* may be associated with a higher weight or priority than the second host entity 220-*b*.

The memory device 240 may be configured to create or support multiple logical partitions or logical units, such as a first logical unit 225-*a*, a second logical unit 225-*b*, a third logical unit 225-*c*, and a fourth logical unit 225-*d*. In some cases, a host entity 220 may be associated with or have access to one or more logical units 225. For example, the first host entity 220-*a* may have access to the first logical unit 225-*a* and the second logical unit 225-*b*, the second host entity 220-*b* may have access to the third logical unit 225-*c*, and the third host entity 220-*c* may have access to the fourth logical unit 225-*d*. In some cases, the host system 205 may include a host entity manager 215 which may control or arbitrate access to the memory system 210.

A logical unit 225 may include a logical grouping of memory cells, such as a group or set of logical addresses. Accordingly, the physical memory cells associated with a logical unit 225 may change according to data management operations performed by the memory system 210, while the logical grouping may remain (independent of the precise physical memory cells performing the storing). For example, the memory system 210 may include data management algorithms or operations to manage data movements between memory cells associated with the logical units 225, such as wear leveling, which may distribute erase or write operations across memory cells included in multiple logical units 225. Accordingly, associating physical blocks of memory cells with host entities may result in expensive changes in data management algorithms, and may reduce their effectiveness, as compared with logical blocks.

In some cases, the host system 205, the memory system 210, or both may move a logical unit 225 associated with a host entity 220 into a read-only state or read-only mode if an endurance parameter of the memory system 210 satisfies a threshold associated with the host entity 220. In some cases, the endurance parameter of the memory system 210 may include or may depend on the health information of the memory system 210. While in a read-only mode, a host entity 220 may be configured to not write data or information to a logical unit 225, while still being configured to read data or information from the logical unit 225.

In some cases, the health information of the memory system 210 may include one or more device health descriptors, such as end of life information, which may indicate a quantity of reserved blocks of the memory system, estimated device lifetime, which may include an estimation of the remaining lifetime of the memory system, TBW, which may include an indication of the quantity of data or information written to the memory system 210 over the lifetime of the memory system 210, or any combination thereof. The endurance parameter may include the health information, or the endurance parameter may be calculated using the health information. For example, the endurance parameter may include indicator of TBW for the memory system 210. Additionally or alternatively, the endurance parameter may include an estimated remaining lifetime of the memory system 210.

A host entity 220 may be associated with a threshold for the endurance parameter which depends on the priority of the host entity 220. Accordingly, if the endurance parameter satisfies the threshold for a host entity 220, the host system 205 of the memory system 210 may initiate a read-only mode for logical units 225 associated with the host entity 220.

By way of example, the endurance parameter may include an indication of the TBW of the memory system. In such an example, the threshold for a higher priority host entity 220, such as the first host entity 220-*a*, may be higher than the threshold for a lower priority host entity 220, such as the second host entity 220-*b*, and the endurance parameter may satisfy the threshold if the TBW exceeds the threshold. Additionally or alternatively, the endurance parameter may include an estimated remaining lifetime of the memory system 210. In such cases, the threshold for a higher priority host entity 220, such as the first host entity 220-*a*, may be different than the threshold for a lower priority host entity 220, such as the second host entity 220-*b*, and the endurance parameter may satisfy the threshold if the estimated remaining lifetime is less than the threshold. Accordingly, the host system 205 or the memory system 210 may initialize a read-only state for the logical units 225 associated with the second host entity 220-*b* (e.g., the third logical unit 225-*c*) prior to initializing a read-only state for the logical units 225 associated with the first host entity 220-*a*.

For example, the host system 205 and the memory system 210 may support one or more vendor commands (e.g., vendor unique (VU) commands) to track health information of the memory system, to track health status of the logical units 225, to initiate a read-only mode of a logical unit 225, or any combination thereof. A vendor command may include a vendor-defined operational code, which the memory system 210 may decrypt and perform actions or operations according to instructions stored in the memory system 210, such as in firmware or a controller. In some systems, some operation codes may be define operations used by host systems that access the memory system and some operation codes may be reserved for other uses, such as commands specific to special use, application or specific vendor.

The one or more vendor commands may include a first vendor command to change or adjust a write access permission for a logical unit 225. For example, the first vendor command may include a write enable bit for the first logical unit 225-*a* which may instruct the memory system 210 to initiate a read-only mode for the first logical unit 225-*a*. While in the read-only mode, the first logical unit 225-*a* may not support or perform write operations, erase operations, or other operations which may change a state or logical value stored in a memory cell of the first logical unit. Accordingly, the first host entity 220-*a* associated with the first logical unit 225-*a* may still read data or information stored in the first logical unit 225-*a*, for example by transmitting a read command, buy may not be able to store or erase data or information stored in the first logical unit 225-*a*.

In some cases, the host system 205 or a host entity 220 may sign the first vendor command (e.g., with a cryptographic signature) using a key associated with the host system 205 or the host entity 220 prior to transmitting the first vendor command. The memory system 210 may decrypt or verify the signature using a key associated with the memory system 210 to determine whether the host system 205 or the host entity 220 is authorized to initiate a read-only state for the logical unit 225 associated with the first vendor command. In some cases, the key associated with the host system 205 or the host entity 220 and the key associated with the memory system 210 may be an example of a symmetric key pair or of an asymmetric key pair.

The one or more vendor commands may include a second vendor command to track or determine a health state of a logical unit 225. The health state of a logical unit 225 may include or may be an indication of whether the logical unit 225 is in a read-only mode, or whether the logical unit 225 is in a tracking mode. For example, if the logical unit 225 is not in a read-only mode or in a tracking mode, the health status of the logical unit 225 may include a first value to indicate that the logical unit is in an initial state. Additionally or alternatively, if the logical unit 225 is in the read-only mode, the health status of the logical unit 225 may include a second value to indicate that the logical unit 225 is in the read-only mode. Further, if the logical unit 225 is in the tracking mode, the health status of the logical unit 225 may include a third value to indicate that the logical unit 225 is in the tracking mode. The health information may be associated with the memory system and a health status may be associated with logical units of the memory system.

The one or more vendor commands may include a third vendor command to configure a tracking policy of a logical unit 225. For example, the third vendor command may include a command to move the logical unit into a tracking mode. Additionally or alternatively, the third vendor command may include an indication of the threshold for the host entity 220 associated with the logical unit 225. While the logical unit 225 in the tracking mode, the memory system 210 may periodically compare the endurance parameter of the memory system 210 to the threshold of the logical unit 225. In some cases, the memory system may include a policy enforcer to track or update the health information or endurance parameter of the memory system If the endurance parameter satisfies the threshold, the memory system 210 may move the logical unit into a read-only mode, for example using the policy enforcer.

In some cases, the host system 205 or a host entity 220 may sign the third vendor command (e.g., with a cryptographic signature) using a key associated with the host system 205 or the host entity 220 prior to transmitting the third vendor command. The memory system 210 may decrypt or verify the signature using a key associated with the memory system 210 to determine whether the host system 205 or the host entity 220 is authorized to initiate a tracking mode for the logical unit 225 associated with the third vendor command. In some cases, the key associated with the host system 205 or the host entity 220 and the key associated with the memory system 210 may be an example of a symmetric key pair or of an asymmetric key pair.

Figure 3:
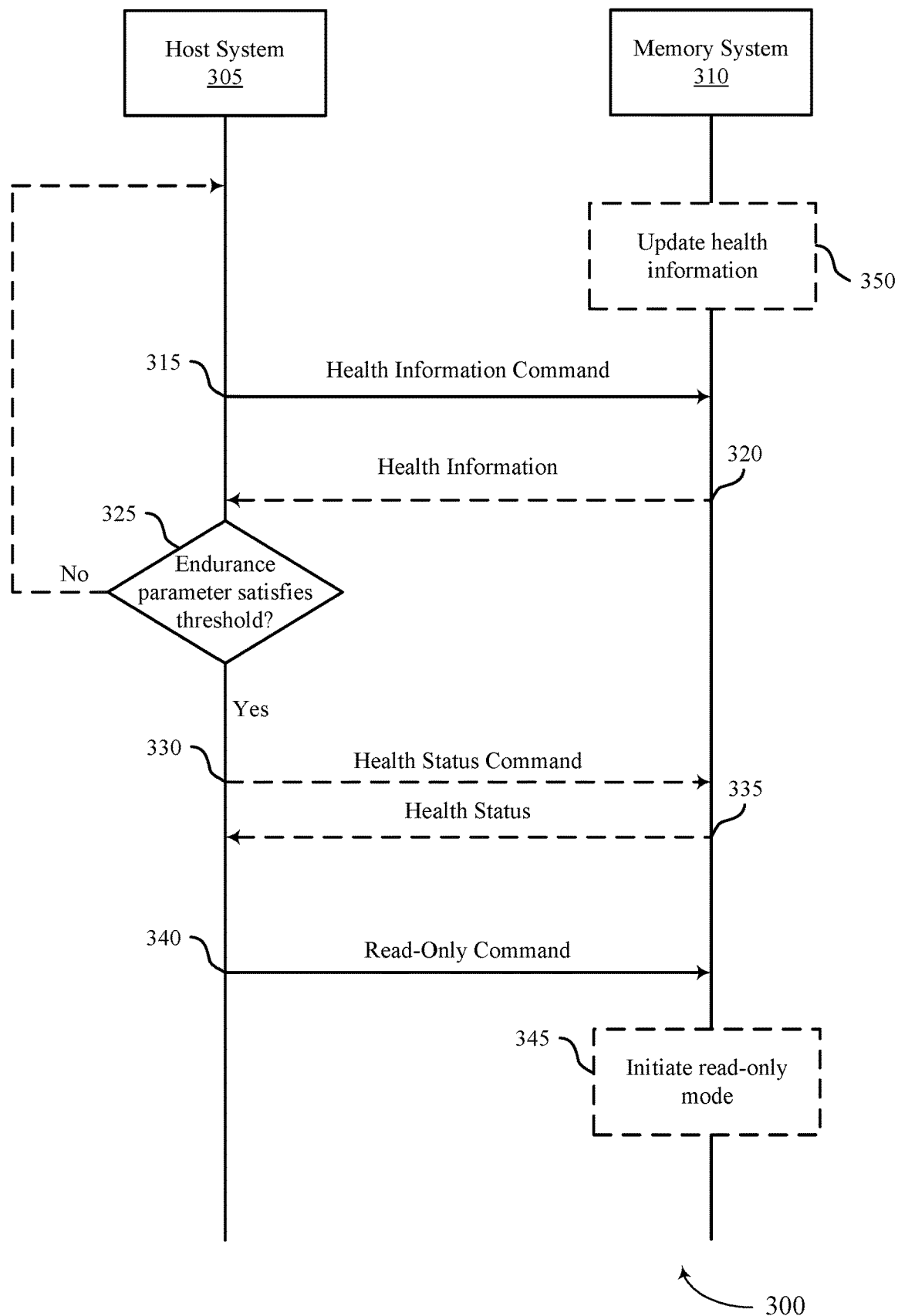
FIG. 3 illustrates an example of a process flow that supports modes to extend life of memory systems in accordance with examples as disclosed herein.

FIG. 3 illustrates an example of a process flow 300 that supports modes to extend life of memory systems in accordance with examples as disclosed herein. In some examples, process flow 300 may be implemented by aspects of the systems 100 and 200. The process flow 300 may include operations performed by a host system 305 which may be an example of the host system described with reference to FIGS. 1 and 2. The memory system 310 may be an example of a memory system as described with reference to FIGS. 1 and 2. In the following description of the process flow 300, the operations may be performed in a different order than the order shown. For example, specific operations may also be left out of the process flow 300, or other operations may be added to process flow 300.

The process flow 300 may illustrate an example of policy enforcement driven or controlled by the host system 305. In some cases, the host system 305 may periodically perform the steps of or operate according to the process flow 300 for one or more host entities and associated logical units, such as the host entities 220 and the logical units 225 as described with reference to FIG. 2. In some cases, the process flow 300 may be performed for each logical unit of the memory system 310, or for each of a subset of the logical units of the memory system 310.

In some cases, the host system 305 may include a program, such as a bootloader, to determine which host entities of the host system 305 are running or otherwise actively associated with a logical unit. Additionally or alternatively, the host system 305 may include a program, such as a health daemon, to track wear or other health information of the memory system 310. The health daemon may be configured to poll the memory system 310 to retrieve the health information, and may include a list or indication of logical units and associated host entities. Additionally or alternatively, the health daemon may assign or associate one or more thresholds for the logical units, for example using the priority or weight of the associated host entities.

In some cases, the process flow 300 may include communicating a command to retrieve health information. For example, at 315, the host system 305 (e.g., via the health daemon) may transmit a command to retrieve the health information of the memory system 310. Accordingly, at 320, the memory system 310 may transmit the health information to the host system 305 in response to receiving the command. In some cases, the host system may generate or calculate an endurance parameter of the memory system 310 using the health information, for example as described with reference to FIG. 2.

In some examples, the process flow may include determining whether the endurance parameter satisfies a first threshold. such as a threshold for a first logical unit associated with a weight or priority of a first host entity. For example, the host system 305 may determine that the endurance parameter from the health information satisfies the first threshold of the first logical unit. In such cases, the process flow 300 may include communicating a command to retrieve the health status of the first logical unit, such as the second vendor command as described with reference to FIG. 2. For example, at 330, the host system 305 may transmit the command to retrieve the health status to the memory system 310. Accordingly, at 335, the memory system 310 may transmit the health status to the host system 305 in response to receiving the command to retrieve the health status. In some examples, the memory system 310 may transmit the health status in response to the health status command received at 330.

In some cases, the process flow 300 may include communicating a command to initiate a read-only mode for the first logical unit, such as the first vendor command as described with reference to FIG. 2. For example, at 340, the host system 305 may transmit the command to move the first logical unit into a read-only mode to the memory system 310. In some examples, the host system 305 may transmit the command to move the first logical unit into a read-only mode in response to receiving the health status at 335 For example, the host system 305 may determine whether the first logical unit is in a read-only mode using the health status. In some cases, if host system 305 determines that the first logical unit is in the read-only mode, the host system 305 may transmit to command to move the first logical unit into the read-only mode.

In some cases, the process flow 300 may include initiating a read-only mode for the first logical unit. For example, at 345, the memory system 310 may initiate the read-only mode for the first logical unit. In some cases, the command to initiate the read-only mode may be signed by the host system 305. In such cases, as part of initiating the read-only mode, the memory system may decrypt or verify the signature of the command to determine whether the host system 305 is authorized to initiate the read-only mode. While the first logical unit is in the read-only mode, the host system 305 may access the first logical unit using read commands, but may not be able to write or erase data or information from the first logical unit.

In some cases, at 325, the host system 305 may determine that the endurance parameter does not satisfy the first threshold. Accordingly, the process flow 300 may include updating the health information of the memory system 310. For example, at 350, the memory system 310 may update the health information and the host system 305 may transmit (e.g., re-transmit) the command to retrieve the health information. In some cases, the host system may delay for a period of time prior to re-transmitting the command to retrieve the health information.

Aspects of the process flow 300 may be implemented by a controller, among other components. Additionally or alternatively, aspects of the process flow 300 may be implemented as instructions stored in memory (e.g., firmware stored in a memory coupled with the memory system 310 or with the host system 305). For example, the instructions, if executed by a controller (e.g., host system controller 106 or the memory system controller 115), may cause the controller to perform the operations of the process flow 300.

Figure 4:
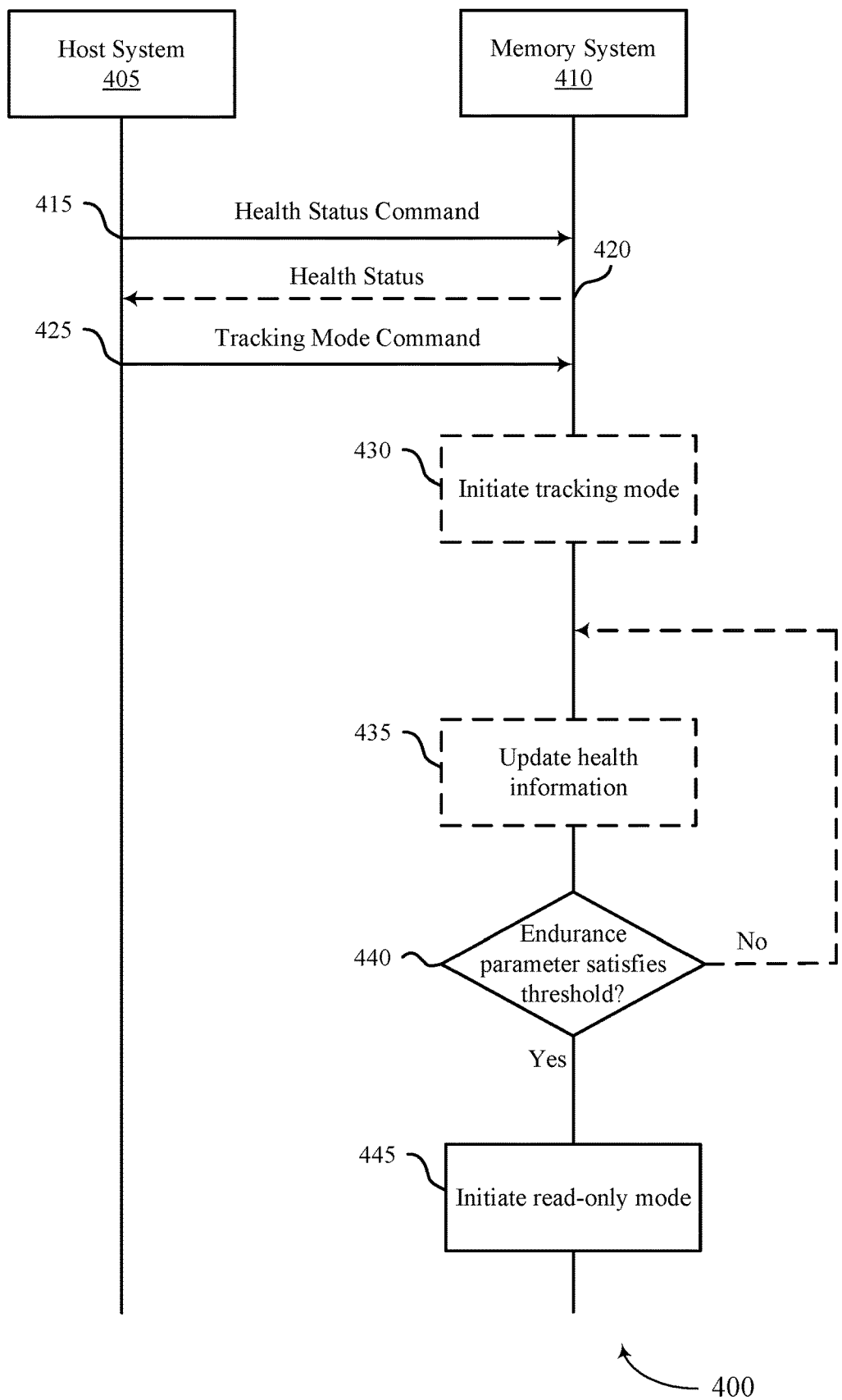
FIG. 4 illustrates an example of a process flow that supports modes to extend life of memory systems in accordance with examples as disclosed herein.

FIG. 4 illustrates an example of a process flow 400 that supports modes to extend life of memory systems in accordance with examples as disclosed herein. In some examples, the process flow 400 may be implemented by aspects of the systems 100 and 200. The process flow 400 may include operations performed by the memory system 410 which may be an example of the memory system described with reference to FIGS. 1 and 2. The host system 405 may be an example of a host system as described with reference to FIGS. 1 and 2. In the following description of the process flow 400, the operations may be performed in a different order than the order shown. For example, specific operations may also be left out of the process flow 400, or other operations may be added to the process flow 400.

The process flow 400 may illustrate an example of policy enforcement driven or controlled by the memory system 410. In some cases, the memory system 410 may periodically perform the steps of or operate according to the process flow 400 for one or more logical units and associated host entities, such as the logical units 225 and the host entities 220 as described with reference to FIG. 2. In some cases, the process flow 400 may be performed for each logical unit of the memory system 410, or for each of a subset of the logical units of the memory system 410.

In some cases, the memory system 410 may include a program, such as a policy enforcer, that tracks the wear or other health information of the memory system 410. The policy enforcer may be configured to periodically determine the wear or other health information of logical units in a tracking mode. Additionally or alternatively, the policy enforcer may be configured to initiate a read-only mode for a logical unit.

In some cases, the process flow 400 may include communicating a command to retrieve the health status of a logical unit of the memory system 410 associated with a host entity of the host system 405. For example, at 415, the host system 405 may transmit a health status command to the memory system 410. In some cases, the command to retrieve health status may be an example of the second vendor command as described with reference to FIG. 2. Accordingly, at 420, the memory system 410 may transmit the health status to the host system 405 in response to receiving the command to retrieve the health status at 415. In some cases, the health status may include an indication of whether the logical unit is in a tracking mode.

In some cases, the process flow 400 may include transmitting a command to initiate a tracking mode for the logical unit. For example, at 425, the host system 405 may transmit a command to initiate the tracking mode to the memory system 410. In some cases, the command to initiate the tracking mode may be an example of the third vendor command as described with reference to FIG. 2. For example, the command to initiate the tracking mode may include a threshold for the logical unit associated with the host entity.

In some examples, the host system 405 may transmit the command to initiate the tracking mode in response to receiving the health status at 420. For example, if the health status of the logical unit indicates that the logical unit is in an initial mode, the host system 405 may transmit the command to initiate the tracking mode for the logical unit.

In some cases, the process flow 400 may include initiating the tracking mode for the logical unit or the set of logical units of the memory system 410. For example, at 430, the memory system 410 may initiate the tracking mode for the logical unit in response to receiving the command to initiate tracking mode at 425. In some cases, the command to initiate tracking mode may be signed by the host system 405. In such cases, as part of initiating the tracking mode, the memory system 410 may decrypt or verify the signatures of the command to determine whether the host system 405 is authorized to initiate the tracking mode. While in the tracking mode, the health information of the logical unit may be monitored by the memory system 410.

In some cases, the process flow may include updating health information of the memory system 410. For example, at 435, the memory system 410 may update its health information. In some cases, the memory system 410 may generate or update an endurance parameter using the health information, for example as described with reference to FIG. 2. Accordingly, at 440, the memory system 410 may determine whether the endurance parameter satisfies the threshold included in the command to initiate the tracking mode. In some examples, the memory system 410 may determine that the endurance parameter satisfies the threshold, and, at 445, the memory system 410 may initiate a read-only mode for the logical unit. While the logical unit is in the read-only mode, the host system 405 may access the logical unit using read commands but may not be able to write or erase data or information from the logical unit.

In some cases, the memory system 410 may determine that the endurance parameter does not satisfy the threshold at 440. Accordingly, the process flow 400 may include periodically updating the health information of the memory system 410 and determining whether the endurance parameter satisfies the threshold.

Aspects of the process flow 400 may be implemented by a controller, among other components. Additionally or alternatively, aspects of the process flow 400 may be implemented as instructions stored in memory (e.g., firmware stored in a memory coupled with the memory system 410 or the host system 405). For example, the instructions, if executed by a controller (e.g., the host system controller 105 or the memory system controller 115), may cause the controller to perform the operations of the process flow 400.

Figure 5:
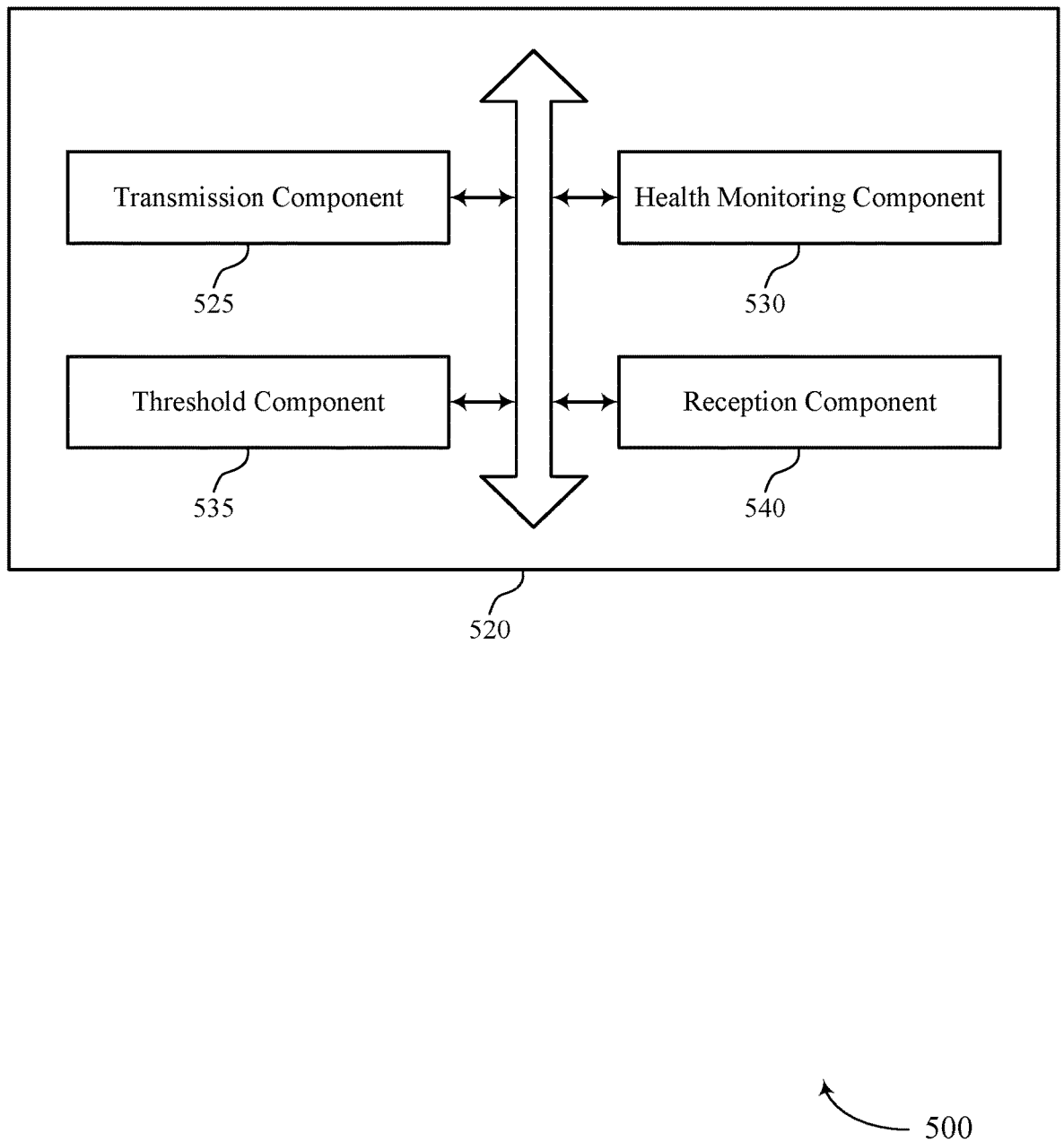
FIG. 5 shows a block diagram of a host system that supports modes to extend life of memory systems in accordance with examples as disclosed herein.

FIG. 5 shows a block diagram 500 of a host system 520 that supports modes to extend life of memory systems in accordance with examples as disclosed herein. The host system 520 may be an example of aspects of a host system as described with reference to FIGS. 1 through 4. The host system 520, or various components thereof, may be an example of means for performing various aspects of modes to extend life of memory systems as described herein. For example, the host system 520 may include a transmission component 525, a health monitoring component 530, a threshold component 535, a reception component 540, or any combination thereof. Each of these components may communicate, directly or indirectly, with one another (e.g., via one or more buses).

The transmission component 525 may be configured as or otherwise support a means for transmitting, to a memory system and from a host system including a plurality of host entities, a first command to retrieve health information of the memory system. The health monitoring component 530 may be configured as or otherwise support a means for determining whether an endurance parameter of the memory system satisfies a first threshold of a plurality of thresholds associated with a first host entity of the plurality of host entities based at least in part on the health information. In some examples, the transmission component 525 may be configured as or otherwise support a means for transmitting, to the memory system, a second command to initiate a read-only mode for a first logical unit associated with the first host entity of the plurality of host entities based at least in part on determining that the endurance parameter satisfies the first threshold.

In some examples, the transmission component 525 may be configured as or otherwise support a means for transmitting, based at least in part on determining that the endurance parameter satisfies the first threshold, a third command to request a health status of the first logical unit of the memory system, where transmitting the second command to initiate the read-only mode for the first logical unit is based at least in part on the health status.

In some examples, the reception component 540 may be configured as or otherwise support a means for receiving the health status of each logical unit associated with the first host entity based at least in part on transmitting the third command, where transmitting the second command to initiate the read-only mode is further based at least in part on the health status of the first logical unit.

In some examples, the health monitoring component 530 may be configured as or otherwise support a means for determining whether the endurance parameter satisfies a second threshold of the plurality of thresholds, the second threshold associated with a second host entity of the plurality of host entities. In some examples, the transmission component 525 may be configured as or otherwise support a means for transmitting a command to initiate the read-only mode for a second logical unit associated with the second host entity of the plurality of host entities based at least in part on determining that the endurance parameter satisfies the second threshold, where the second threshold is different from the first threshold.

In some examples, the endurance parameter includes an indicator of a total bytes written to the memory system. In some examples, determining whether the endurance parameter satisfies the first threshold includes determining whether the total bytes written exceeds the first threshold.

In some examples, the endurance parameter includes an estimated remaining lifetime of the memory system. In some examples, determining whether the endurance parameter satisfies the first threshold includes determining whether the estimated remaining lifetime is less than the first threshold.

In some examples, the second command to initiate the read-only mode includes a cryptographic signature of the host system.

In some examples, a health status of the first logical unit includes an indication of whether the first logical unit is in the read-only mode, an indication of whether the first logical unit is being tracked, or both.

In some examples, the threshold component 535 may be configured as or otherwise support a means for assigning the first threshold to the first logical unit based at least in part on a weight of the first host entity, where determining whether the endurance parameter satisfies the first threshold is further based at least in part on assigning the first threshold.

In some examples, the transmission component 525 may be configured as or otherwise support a means for transmitting, after a period of time, a third command to retrieve updated health information of the memory system, where the endurance parameter is further based at least in part on the updated health information.

Figure 6:
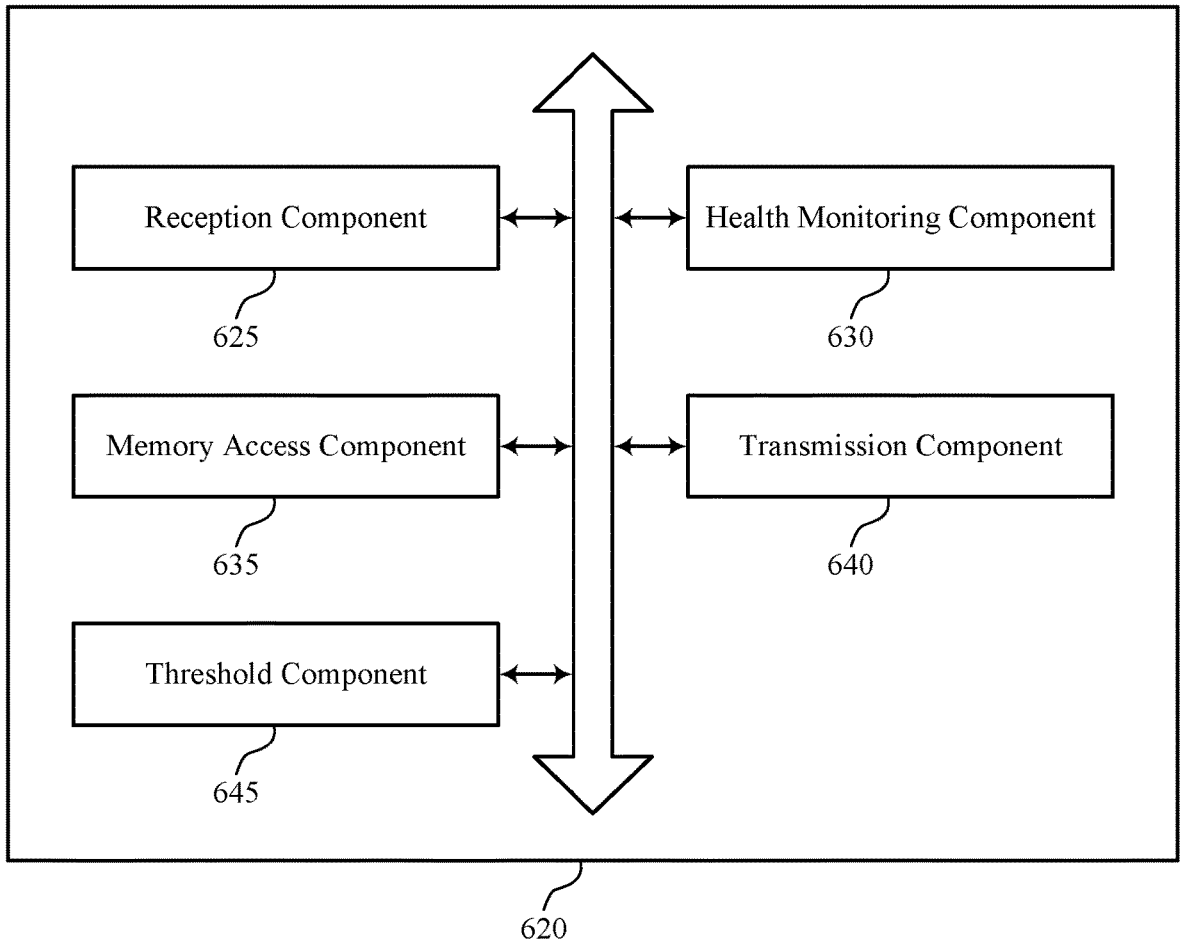
FIG. 6 shows a block diagram of a memory system that supports modes to extend life of memory systems in accordance with examples as disclosed herein.

FIG. 6 shows a block diagram 600 of a memory system 620 that supports modes to extend life of memory systems in accordance with examples as disclosed herein. The memory system 620 may be an example of aspects of a memory system as described with reference to FIGS. 1 through 4. The memory system 620, or various components thereof, may be an example of means for performing various aspects of modes to extend life of memory systems as described herein. For example, the memory system 620 may include a reception component 625, a health monitoring component 630, a memory access component 635, a transmission component 640, a threshold component 645, or any combination thereof. Each of these components may communicate, directly or indirectly, with one another (e.g., via one or more buses).

The reception component 625 may be configured as or otherwise support a means for receiving, at a memory system from a host system including a plurality of host entities, a first command to retrieve a health status of a first logical unit associated with a first host entity of the plurality of host entities. In some examples, the reception component 625 may be configured as or otherwise support a means for receiving, at the memory system, a second command to initiate a tracking mode of the first logical unit based at least in part on the health status of the first logical unit. The health monitoring component 630 may be configured as or otherwise support a means for determining whether an endurance parameter of the memory system satisfies a first threshold of a plurality of thresholds, the first threshold associated with the first host entity, based at least in part on receiving the first command to initiate the tracking mode. The memory access component 635 may be configured as or otherwise support a means for initiating a read-only mode for the first logical unit associated based at least in part on determining that the endurance parameter satisfies the first threshold.

In some examples, the health monitoring component 630 may be configured as or otherwise support a means for determining whether the first logical unit is in the tracking mode based at least in part on the health status of the first logical unit, where initiating the read-only mode for the first logical unit is further based at least in part on determining that the first logical unit is in the tracking mode.

In some examples, the transmission component 640 may be configured as or otherwise support a means for transmitting, to the host system, the health status of the first logical unit based at least in part on receiving the first command to retrieve the health status, where receiving the second command to initiate the tracking mode of the first logical unit is further based at least in part on transmitting the health status.

In some examples, the health monitoring component 630 may be configured as or otherwise support a means for updating the endurance parameter of the memory system, where determining whether the endurance parameter satisfies the first threshold is based at least in part on updating the endurance parameter.

In some examples, each threshold of the plurality of thresholds is associated with a respective host entity of the plurality of host entities.

In some examples, the memory access component 635 may be configured as or otherwise support a means for initiating the tracking mode of the first logical unit based at least in part on receiving the second command, where determining whether the endurance parameter satisfies the first threshold is further based at least in part on initiating the tracking mode.

In some examples, the second command to initiate the tracking mode includes a signature of the host system. In some examples, initiating the tracking mode of the first logical unit is further based at least in part on verifying the signature of the host system.

In some examples, the endurance parameter includes an indicator of a total bytes written to the memory system. In some examples, determining whether the endurance parameter satisfies the first threshold includes determining whether the total bytes written exceeds the first threshold.

In some examples, the endurance parameter includes an estimated remaining lifetime of the memory system. In some examples, determining whether the endurance parameter satisfies the first threshold includes determining whether the estimated remaining lifetime is less than the first threshold.

In some examples, the health status of the first logical unit includes an indication of whether the first logical unit is in the read-only mode, an indication of whether the first logical unit is being tracked, or both.

In some examples, the threshold component 645 may be configured as or otherwise support a means for assigning the first threshold to the first logical unit based at least in part on a weight of the first host entity, where determining whether the endurance parameter satisfies the first threshold is further based at least in part on assigning the first threshold.

Figure 7:
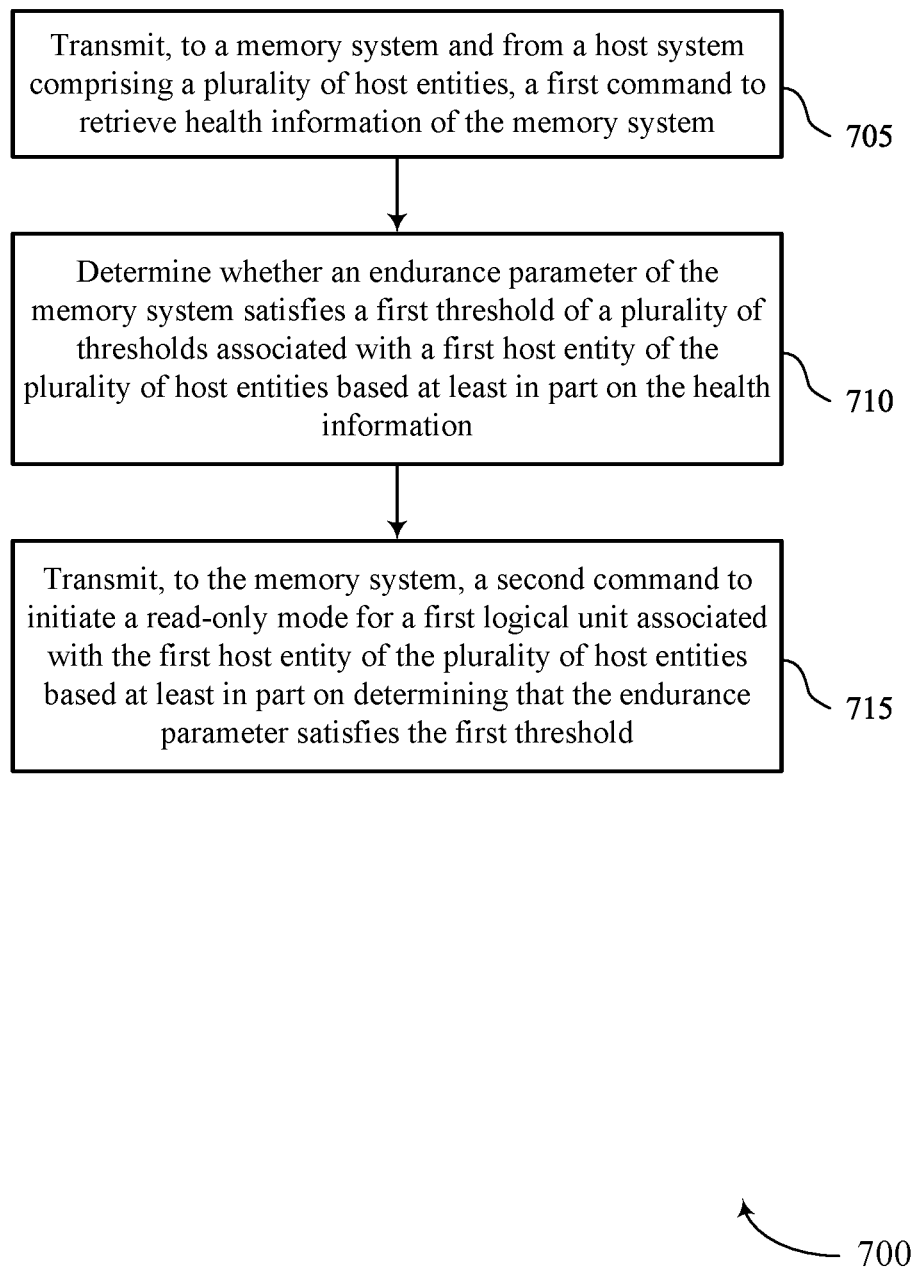
FIGS. 7 and 8 show flowcharts illustrating a method or methods that support modes to extend life of memory systems in accordance with examples as disclosed herein.

FIG. 7 shows a flowchart illustrating a method 700 that supports modes to extend life of memory systems in accordance with examples as disclosed herein. The operations of method 700 may be implemented by a host system or its components as described herein. For example, the operations of method 700 may be performed by a host system as described with reference to FIGS. 1 through 5. In some examples, a host system may execute a set of instructions to control the functional elements of the device to perform the described functions. Additionally or alternatively, the host system may perform aspects of the described functions using special-purpose hardware.

At 705, the method may include transmitting, to a memory system and from a host system including a plurality of host entities, a first command to retrieve health information of the memory system. The operations of 705 may be performed in accordance with examples as disclosed herein. In some examples, aspects of the operations of 705 may be performed by a transmission component 525 as described with reference to FIG. 5.

At 710, the method may include determining whether an endurance parameter of the memory system satisfies a first threshold of a plurality of thresholds associated with a first host entity of the plurality of host entities based at least in part on the health information. The operations of 710 may be performed in accordance with examples as disclosed herein. In some examples, aspects of the operations of 710 may be performed by a health monitoring component 530 as described with reference to FIG. 5.

At 715, the method may include transmitting, to the memory system, a second command to initiate a read-only mode for a first logical unit associated with the first host entity of the plurality of host entities based at least in part on determining that the endurance parameter satisfies the first threshold. The operations of 715 may be performed in accordance with examples as disclosed herein. In some examples, aspects of the operations of 715 may be performed by a transmission component 525 as described with reference to FIG. 5.

In some examples, an apparatus as described herein may perform a method or methods, such as the method 700. The apparatus may include features, circuitry, logic, means, or instructions (e.g., a non-transitory computer-readable medium storing instructions executable by a processor), or any combination thereof for performing the following aspects of the present disclosure:

Aspect 1: The method or apparatus, including operations, features, circuitry, logic, means, or instructions, or any combination thereof for transmitting, to a memory system and from a host system including a plurality of host entities, a first command to retrieve health information of the memory system; determining whether an endurance parameter of the memory system satisfies a first threshold of a plurality of thresholds associated with a first host entity of the plurality of host entities based at least in part on the health information; and transmitting, to the memory system, a second command to initiate a read-only mode for a first logical unit associated with the first host entity of the plurality of host entities based at least in part on determining that the endurance parameter satisfies the first threshold.

Aspect 2: The method or apparatus of aspect 1, further including operations, features, circuitry, logic, means, or instructions, or any combination thereof for transmitting, based at least in part on determining that the endurance parameter satisfies the first threshold, a third command to request a health status of the first logical unit of the memory system, where transmitting the second command to initiate the read-only mode for the first logical unit is based at least in part on the health status.

Aspect 3: The method or apparatus of aspect 2, further including operations, features, circuitry, logic, means, or instructions, or any combination thereof for receiving the health status of each logical unit associated with the first host entity based at least in part on transmitting the third command, where transmitting the second command to initiate the read-only mode is further based at least in part on the health status of the first logical unit.

Aspect 4: The method or apparatus of any of aspects 1 through 3, further including operations, features, circuitry, logic, means, or instructions, or any combination thereof for determining whether the endurance parameter satisfies a second threshold of the plurality of thresholds, the second threshold associated with a second host entity of the plurality of host entities and transmitting a command to initiate the read-only mode for a second logical unit associated with the second host entity of the plurality of host entities based at least in part on determining that the endurance parameter satisfies the second threshold, where the second threshold is different from the first threshold.

Aspect 5: The method or apparatus of any of aspects 1 through 4, further including operations, features, circuitry, logic, means, or instructions, or any combination thereof for the endurance parameter includes an indicator of a total bytes written to the memory system and determining whether the endurance parameter satisfies the first threshold includes determining whether the total bytes written exceeds the first threshold.

Aspect 6: The method or apparatus of any of aspects 1 through 5, further including operations, features, circuitry, logic, means, or instructions, or any combination thereof for the endurance parameter includes an estimated remaining lifetime of the memory system and determining whether the endurance parameter satisfies the first threshold includes determining whether the estimated remaining lifetime is less than the first threshold.

Aspect 7: The method or apparatus of any of aspects 1 through 6, further including operations, features, circuitry, logic, means, or instructions, or any combination thereof for the second command to initiate the read-only mode includes a cryptographic signature of the host system.

Aspect 8: The method or apparatus of any of aspects 1 through 7, further including operations, features, circuitry, logic, means, or instructions, or any combination thereof for a health status of the first logical unit includes an indication of whether the first logical unit is in the read-only mode, an indication of whether the first logical unit is being tracked, or both.

Aspect 9: The method or apparatus of any of aspects 1 through 8, further including operations, features, circuitry, logic, means, or instructions, or any combination thereof for assigning the first threshold to the first logical unit based at least in part on a weight of the first host entity, where determining whether the endurance parameter satisfies the first threshold is further based at least in part on assigning the first threshold.

Aspect 10: The method or apparatus of any of aspects 1 through 9, further including operations, features, circuitry, logic, means, or instructions, or any combination thereof for transmitting, after a period of time, a third command to retrieve updated health information of the memory system, where the endurance parameter is further based at least in part on the updated health information.

Figure 8:
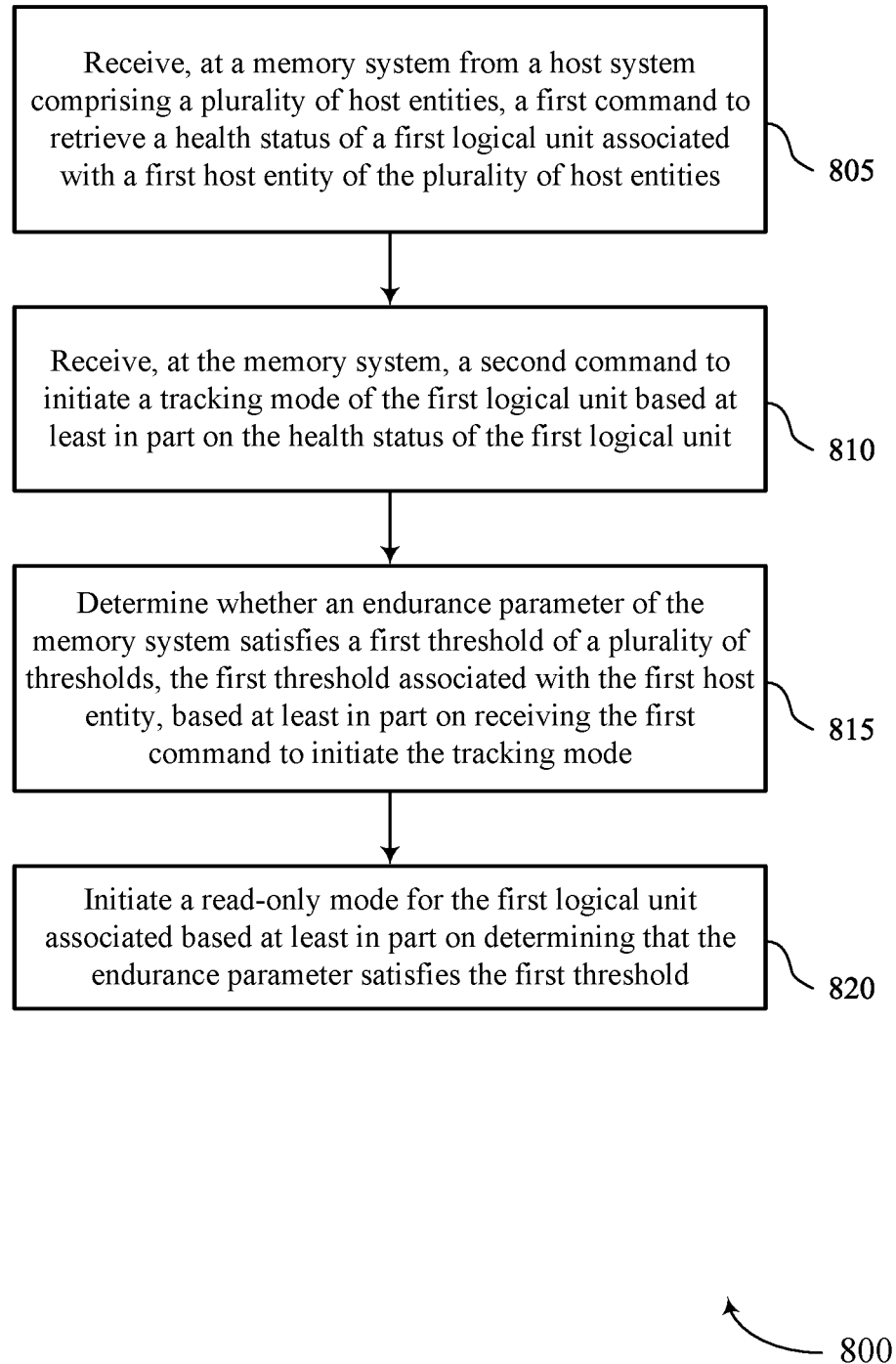

FIG. 8 shows a flowchart illustrating a method 800 that supports modes to extend life of memory systems in accordance with examples as disclosed herein. The operations of method 800 may be implemented by a memory system or its components as described herein. For example, the operations of method 800 may be performed by a memory system as described with reference to FIGS. 1 through 4 and 6. In some examples, a memory system may execute a set of instructions to control the functional elements of the device to perform the described functions. Additionally or alternatively, the memory system may perform aspects of the described functions using special-purpose hardware.

At 805, the method may include receiving, at a memory system from a host system including a plurality of host entities, a first command to retrieve a health status of a first logical unit associated with a first host entity of the plurality of host entities. The operations of 805 may be performed in accordance with examples as disclosed herein. In some examples, aspects of the operations of 805 may be performed by a reception component 625 as described with reference to FIG. 6.

At 810, the method may include receiving, at the memory system, a second command to initiate a tracking mode of the first logical unit based at least in part on the health status of the first logical unit. The operations of 810 may be performed in accordance with examples as disclosed herein. In some examples, aspects of the operations of 810 may be performed by a reception component 625 as described with reference to FIG. 6.

At 815, the method may include determining whether an endurance parameter of the memory system satisfies a first threshold of a plurality of thresholds, the first threshold associated with the first host entity, based at least in part on receiving the first command to initiate the tracking mode. The operations of 815 may be performed in accordance with examples as disclosed herein. In some examples, aspects of the operations of 815 may be performed by a health monitoring component 630 as described with reference to FIG. 6.

At 820, the method may include initiating a read-only mode for the first logical unit associated based at least in part on determining that the endurance parameter satisfies the first threshold. The operations of 820 may be performed in accordance with examples as disclosed herein. In some examples, aspects of the operations of 820 may be performed by a memory access component 635 as described with reference to FIG. 6.

In some examples, an apparatus as described herein may perform a method or methods, such as the method 800. The apparatus may include features, circuitry, logic, means, or instructions (e.g., a non-transitory computer-readable medium storing instructions executable by a processor), or any combination thereof for performing the following aspects of the present disclosure:

Aspect 11: The method or apparatus, including operations, features, circuitry, logic, means, or instructions, or any combination thereof for receiving, at a memory system from a host system including a plurality of host entities, a first command to retrieve a health status of a first logical unit associated with a first host entity of the plurality of host entities; receiving, at the memory system, a second command to initiate a tracking mode of the first logical unit based at least in part on the health status of the first logical unit; determining whether an endurance parameter of the memory system satisfies a first threshold of a plurality of thresholds, the first threshold associated with the first host entity, based at least in part on receiving the first command to initiate the tracking mode; and initiating a read-only mode for the first logical unit associated based at least in part on determining that the endurance parameter satisfies the first threshold.

Aspect 12: The method or apparatus of aspect 11, further including operations, features, circuitry, logic, means, or instructions, or any combination thereof for determining whether the first logical unit is in the tracking mode based at least in part on the health status of the first logical unit, where initiating the read-only mode for the first logical unit is further based at least in part on determining that the first logical unit is in the tracking mode.

Aspect 13: The method or apparatus of any of aspects 11 through 12, further including operations, features, circuitry, logic, means, or instructions, or any combination thereof for transmitting, to the host system, the health status of the first logical unit based at least in part on receiving the first command to retrieve the health status, where receiving the second command to initiate the tracking mode of the first logical unit is further based at least in part on transmitting the health status.

Aspect 14: The method or apparatus of any of aspects 11 through 13, further including operations, features, circuitry, logic, means, or instructions, or any combination thereof for updating the endurance parameter of the memory system, where determining whether the endurance parameter satisfies the first threshold is based at least in part on updating the endurance parameter.

Aspect 15: The method or apparatus of any of aspects 11 through 14, further including operations, features, circuitry, logic, means, or instructions, or any combination thereof for each threshold of the plurality of thresholds is associated with a respective host entity of the plurality of host entities.

Aspect 16: The method or apparatus of any of aspects 11 through 15, further including operations, features, circuitry, logic, means, or instructions, or any combination thereof for initiating the tracking mode of the first logical unit based at least in part on receiving the second command, where determining whether the endurance parameter satisfies the first threshold is further based at least in part on initiating the tracking mode.

Aspect 17: The method or apparatus of aspect 16, further including operations, features, circuitry, logic, means, or instructions, or any combination thereof for the second command to initiate the tracking mode includes a signature of the host system and initiating the tracking mode of the first logical unit is further based at least in part on verifying the signature of the host system.

Aspect 18: The method or apparatus of any of aspects 11 through 17, further including operations, features, circuitry, logic, means, or instructions, or any combination thereof for the endurance parameter includes an indicator of a total bytes written to the memory system and determining whether the endurance parameter satisfies the first threshold includes determining whether the total bytes written exceeds the first threshold.

Aspect 19: The method or apparatus of any of aspects 11 through 18, further including operations, features, circuitry, logic, means, or instructions, or any combination thereof for the endurance parameter includes an estimated remaining lifetime of the memory system and determining whether the endurance parameter satisfies the first threshold includes determining whether the estimated remaining lifetime is less than the first threshold.

Aspect 20: The method or apparatus of any of aspects 11 through 19, further including operations, features, circuitry, logic, means, or instructions, or any combination thereof for the health status of the first logical unit includes an indication of whether the first logical unit is in the read-only mode, an indication of whether the first logical unit is being tracked, or both.

Aspect 21: The method or apparatus of any of aspects 11 through 20, further including operations, features, circuitry, logic, means, or instructions, or any combination thereof for assigning the first threshold to the first logical unit based at least in part on a weight of the first host entity, where determining whether the endurance parameter satisfies the first threshold is further based at least in part on assigning the first threshold.

It should be noted that the methods described above describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and a second condition or action may at least partially occur as a result of the previous condition or action occurring (whether directly after or after one or more other intermediate conditions or actions occurring after the first condition or action).

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A host system, comprising:
one or more first controllers associated with one or more memory devices and configured to cause the host system to:
transmit, to a memory system and from the host system external to the memory system, the memory system comprising one or more second controllers and the one or more memory devices, and the host system comprising a plurality of host entities, a first command to retrieve health information of the memory system, wherein each host entity of the plurality of host entities comprises a respective virtual machine or container managed by the host system and is associated with a respective priority;
receive, at the host system and from the memory system, the health information based at least in part on transmitting the first command to the memory system;
determine, at the host system external to the memory system, whether an endurance parameter of the memory system satisfies a first threshold of a plurality of thresholds associated with a first host entity of the plurality of host entities based at least in part on the health information, wherein the first threshold is based at least in part on a first priority associated with the first host entity; and
transmit, to the memory system and from the host system external to the memory system, a second command to initiate a read-only mode for a first logical unit associated with the first host entity of the plurality of host entities based at least in part on determining at the host system that the endurance parameter satisfies the first threshold.

2. The host system of claim 1, wherein the one or more first controllers is further configured to cause the host system to:
transmit, based at least in part on determining that the endurance parameter satisfies the first threshold, a third command to request a health status of the first logical unit of the memory system, wherein transmitting the second command to initiate the read-only mode for the first logical unit is based at least in part on the health status.

3. The host system of claim 2, wherein the one or more first controllers is further configured to cause the host system to:
receive the health status of each logical unit associated with the first host entity based at least in part on transmitting the third command, wherein transmitting the second command to initiate the read-only mode is further based at least in part on the health status of the first logical unit.

4. The host system of claim 1, wherein the one or more first controllers is further configured to cause the host system to:
determine whether the endurance parameter satisfies a second threshold of the plurality of thresholds, the second threshold associated with a second host entity of the plurality of host entities; and
transmit a command to initiate the read-only mode for a second logical unit associated with the second host entity of the plurality of host entities based at least in part on determining that the endurance parameter satisfies the second threshold, wherein the second threshold is different from the first threshold.

5. The host system of claim 1, wherein:
the endurance parameter comprises an indicator of a total bytes written to the memory system, and
determining whether the endurance parameter satisfies the first threshold comprises determining whether the total bytes written exceeds the first threshold.

6. The host system of claim 1, wherein:
the endurance parameter comprises an estimated remaining lifetime of the memory system, and
determining whether the endurance parameter satisfies the first threshold comprises determining whether the estimated remaining lifetime is less than the first threshold.

7. The host system of claim 1, wherein the second command to initiate the read-only mode comprises a cryptographic signature of the host system.

8. The host system of claim 1, wherein a health status of the first logical unit comprises an indication of whether the first logical unit is in the read-only mode, an indication of whether the first logical unit is being tracked, or both.

9. The host system of claim 1, wherein the one or more first controllers is further configured to cause the host system to:
assign the first threshold to the first logical unit based at least in part on a weight of the first host entity being higher than a weight of a second host entity, wherein determining whether the endurance parameter satisfies the first threshold is further based at least in part on assigning the first threshold.

10. The host system of claim 1, wherein the one or more first controllers is further configured to cause the host system to:
transmit, after a period of time, a third command to retrieve updated health information of the memory system, wherein the endurance parameter is further based at least in part on the updated health information.

11. A memory system, comprising:
one or more memory devices; and
one or more controllers coupled with the one or more memory devices and configured to cause the memory system to:
receive, at the memory system and from a host system external to the memory system, the host system comprising a plurality of host entities, a first command to retrieve a health status of a first logical unit associated with a first host entity of the plurality of host entities, wherein each host entity of the plurality of host entities is associated with a respective priority;
receive, at the memory system and from the host system external to the memory system, a second command to initiate a tracking mode of the first logical unit based at least in part on the health status of the first logical unit and before initiating a tracking mode;
determine, at the memory system after initiating the tracking mode, whether an endurance parameter of the memory system satisfies a first threshold of a plurality of thresholds, the first threshold associated with the first host entity, based at least in part on receiving the second command to initiate the tracking mode, wherein the first threshold is based at least in part on a first priority associated with the first host entity; and initiate a read-only mode for the first logical unit associated based at least in part on determining that the endurance parameter satisfies the first threshold.

12. The memory system of claim 11, wherein the one or more controllers is further configured to cause the memory system to:
determine whether the first logical unit is in the tracking mode based at least in part on the health status of the first logical unit, wherein initiating the read-only mode for the first logical unit is further based at least in part on determining that the first logical unit is in the tracking mode.

13. The memory system of claim 11, wherein the one or more controllers is further configured to cause the memory system to:
transmit, to the host system, the health status of the first logical unit based at least in part on receiving the first command to retrieve the health status, wherein receiving the second command to initiate the tracking mode of the first logical unit is further based at least in part on transmitting the health status.

14. The memory system of claim 11, wherein the one or more controllers is further configured to cause the memory system to:
update the endurance parameter of the memory system, wherein determining whether the endurance parameter satisfies the first threshold is based at least in part on updating the endurance parameter.

15. The memory system of claim 11, wherein each threshold of the plurality of thresholds is associated with a respective host entity of the plurality of host entities.

16. The memory system of claim 11, wherein the one or more controllers is further configured to cause the memory system to:
initiate the tracking mode of the first logical unit based at least in part on receiving the second command, wherein determining whether the endurance parameter satisfies the first threshold is further based at least in part on initiating the tracking mode.

17. The memory system of claim 16, wherein:
the second command to initiate the tracking mode comprises a signature of the host system, and
initiating the tracking mode of the first logical unit is further based at least in part on verifying the signature of the host system.

18. The memory system of claim 11, wherein:
the endurance parameter comprises an indicator of a total bytes written to the memory system, and
determining whether the endurance parameter satisfies the first threshold comprises determining whether the total bytes written exceeds the first threshold.

19. The memory system of claim 11, wherein:
the endurance parameter comprises an estimated remaining lifetime of the memory system, and
determining whether the endurance parameter satisfies the first threshold comprises determining whether the estimated remaining lifetime is less than the first threshold.

20. The memory system of claim 11, wherein the health status of the first logical unit comprises an indication of whether the first logical unit is in the read-only mode, an indication of whether the first logical unit is being tracked, or both.

21. The memory system of claim 11, wherein the one or more controllers is further configured to cause the memory system to:
assign the first threshold to the first logical unit based at least in part on a weight of the first host entity being higher than a weight of a second host entity, wherein determining whether the endurance parameter satisfies the first threshold is further based at least in part on assigning the first threshold.

22. A non-transitory computer-readable medium storing code comprising instructions which, when executed by one or more first controllers of a host system, cause the host system to:
transmit, to a memory system and from the host system external to the memory system, the memory system comprising one or more second controllers and one or more memory devices, and the host system comprising a plurality of host entities, a first command to retrieve health information of the memory system, wherein each host entity of the plurality of host entities comprises a respective virtual machine or container managed by the host system and is associated with a respective priority;
receive, at the host system and from the memory system, the health information based at least in part on transmitting the first command to the memory system;
determine, at the host system external to the memory system, whether an endurance parameter of the memory system satisfies a first threshold of a plurality of thresholds associated with a first host entity of the plurality of host entities based at least in part on the health information, wherein the first threshold is based at least in part on a first priority associated with the first host entity; and
transmit, to the memory system and from the host system external to the memory system, a second command to initiate a read-only mode for a first logical unit associated with the first host entity of the plurality of host entities based at least in part on determining at the host system that the endurance parameter satisfies the first threshold.

23. The non-transitory computer-readable medium of claim 22, wherein the instructions, when executed by the one or more first controllers of the host system, further cause the host system to:
transmit, based at least in part on determining that the endurance parameter satisfies the first threshold, a third command to request a health status of the first logical unit of the memory system, wherein transmitting the second command to initiate the read-only mode for the first logical unit is based at least in part on the health status.

24. The non-transitory computer-readable medium of claim 23, wherein the instructions, when executed by the one or more first controllers of the host system, further cause the host system to:
receive the health status of each logical unit associated with the first host entity based at least in part on transmitting the third command, wherein transmitting the second command to initiate the read-only mode is further based at least in part on the health status of the first logical unit.

25. The non-transitory computer-readable medium of claim 22, wherein the instructions, when executed by the one or more first controllers of the host system, further cause the host system to:
determine whether the endurance parameter satisfies a second threshold of the plurality of thresholds, the second threshold associated with a second host entity of the plurality of host entities; and
transmit a command to initiate the read-only mode for a second logical unit associated with the second host entity of the plurality of host entities based at least in part on determining that the endurance parameter satisfies the second threshold, wherein the second threshold is different from the first threshold.

* * * * *